United States Patent [19]

Hirs

[11] 4,274,961

[45] Jun. 23, 1981

[54] PRESSURE FILTER

[76] Inventor: Gene Hirs, 6865 Meadow Lake Dr., Birmingham, Mich. 48010

[21] Appl. No.: 85,657

[22] Filed: Oct. 17, 1979

Related U.S. Application Data

[63] Continuation-in-part of Ser. No. 739,755, Nov. 5, 1976, Pat. No. 4,230,572.

[51] Int. Cl.³ .................................................. B01D 25/32
[52] U.S. Cl. .................................... 210/225; 100/115; 210/387
[58] Field of Search ................. 100/195, 196, 269 R, 100/115; 210/224, 225, 226, 227, 228, 229, 230, 86, 387, 391

[56] References Cited

U.S. PATENT DOCUMENTS

| 1,331,350 | 2/1920 | Miller | 210/230 |
|---|---|---|---|
| 1,749,080 | 3/1930 | Mothers | 210/230 |
| 3,342,123 | 9/1967 | Ermatkov et al. | 210/225 |
| 3,437,210 | 4/1969 | O'Neil | 210/387 |
| 3,648,841 | 3/1972 | Schotten et al. | 210/224 |
| 3,731,808 | 5/1973 | Rictert | 210/387 |
| 3,750,563 | 8/1973 | Tinjum | 100/194 |
| 3,807,567 | 4/1974 | Iwatani | 210/225 |
| 3,814,688 | 6/1974 | Hirs | 210/387 |
| 3,899,426 | 8/1975 | Hirs | 210/387 |
| 3,968,039 | 7/1976 | Inajima | 210/225 |
| 4,070,288 | 1/1978 | Gertis | 210/86 |

*Primary Examiner*—Theodore A. Granger
*Attorney, Agent, or Firm*—Cullen, Sloman, Cantor, Grauer, Scott & Rutherford

[57] ABSTRACT

An automated plate and frame type of pressure filter comprises a plurality of vertically superimposed horizontal shells, each vertically adjacent pair of which having a horizontal filter media belt sandwiched therebetween. All shells but the bottom shell are movable vertically by a pair of lift cylinders to separate opposed pairs and allow the filter belts to be indexed horizontally for cleaning. On completion of the belt cleaning cycle, the shells are pressed together by the double-acting lift cylinders which temporarily over-compress seals on the edges of the shells, allowing a structurally reinforced mechanical locking system to engage which opposes and resists the substantial shell-separating forces generated by the subsequently applied filtration pressure. The top shell receives contaminated liquid under pressure, which liquid is forced downwardly through a filter belt into the upper chamber of the next adjacent shell, from which clarified filtrate is withdrawn, the contaminating particles remaining behind as a filter cake on the upper surface of the filter belt. Each intermediate shell also has a lower chamber which is sealed from the upper chamber of such shell and which, like the top shell, receives pressurized contaminated liquid and cooperates with the upper chamber of the next lower shell and the interposed filter belt to filter out the contaminants. Upon accumulation of excessive filter cake, as measured by a pressure switch, the supply of contaminated liquid is shut off, the locking mechanism released and the shells separated to allow indexing and cleaning of the filters. Each filter belt traverses horizontally from a supply roll to a discharge roll for cleaning, and then is rewound onto the supply roll to start the next filtration cycle. All supply and discharge rolls are simultaneously frictionally power-driven from a single endless loop cable which is winch-driven and winds around pulleys coaxial with each roll. The cable is slack when the shells are locked together for filtration, because the vertical spacing between the rolls, which are secured to the vertically movable shells, is then reduced. However, the cable becomes taut and capable of frictionally driving the rolls when the shells and their associated rolls are vertically separated for belt indexing and cleaning.

5 Claims, 14 Drawing Figures

PRESSURE FILTER

RELATED APPLICATION

This application is a continuation-in-part of my co-pending application entitled "Filter Method and Apparatus", Ser. No. 739,755, filed Nov. 5, 1976, now U.S. Pat. No. 4,230,572.

BACKGROUND OF THE INVENTION

Pressure filters of the plate and frame type have been extensively used and described in the prior art. These filters, described in further detail in the "Background of Invention" discussion of my co-pending application Ser. No. 739,755, generally comprise one or more sealed but separable chambers each of which contains one or more filter plates or leaves through which contaminated liquid is forced under pressure. Where multiple chambers are employed, the separation of the chambers and draining of the plates to allow the solids to be removed as a dry cake can be laborious, time consuming and expensive. Applicant's prior patents, such as U.S. Pat. Nos. 2,867,324, 2,867,325 and 2,867,326, improved upon the basic plate and frame type of filter by utilizing a simplified but completely automated single plate type of filter, permitting filtration and dry sludge removal without any manual attention.

One limitation on this type of pressure filter is the need for a strong supporting structure capable of withstanding the substantial internal forces generated by the hydraulic pressures. For example, a 10 psi internal hydraulic pressure requires 1440 pounds of external reaction force for every square foot of filter area. Since most of these filters are used on fairly porous suspended solids such as those generated from machining operations, the low hydraulic pressures which these machines can withstand are quite adequate for filtration. The sealing requirements and reaction forces generally limit this type of filter to 10 to 12 psi internal hydraulic pressure and 100 square feet of filter area.

Subsequent improvements by applicant included the use of expandable or inflatable seals such as shown in U.S. Pat. No. 3,306,458 and the use of a movable seal with stationary shells, such as shown in U.S. Pat. No. 3,333,693. A variety of configurations has been developed in an attempt to increase the flow rates and contaminant concentration capacities of the pressurized filters, including multiple separable filter shells, automated dirt discharge and combinations of permanent and movable filter belts. Examples of such systems are shown in applicant's further U.S. Pat. Nos. 3,335,862, 3,478,879 and 3,497,063.

Nevertheless, these prior pressurized filters did not have the capacity to handle the high filtration pressures required for applications such as dewatering of pulverized coal slurries after they have been conveyed through pipelines. In such an application, the high concentration of very fine suspended solids, such as 25-40% solids, accumulates rapidly with flow rates of 0.25 to 2 gallons per minute per square foot, quickly plugging up the filter cake pores, thus substantially reducing the flow rate. Only considerably higher pressures, such as 50 to 100 psi, can significantly improve flow rates and filter through-put capacity in such applications. Because the quantities of sludge involved in such systems may reach many tons per hour; it is desirable to develop filter systems having maximum filter area and the structural strength to resist high internal hydraulic pressures.

Applicant's above referred to co-pending application disclosed an improved mechanical locking system capable of accommodating hydraulic pressures of 100 to 250 psi in a two-shell pressurized filter system.

In spite of the above described advances in the art, substantial practical limitations remained to the significant increase in effective filter area. For example, increasing the number of vertically superimposed shells, to increase the amount of filter area for a given floor area, entails substantial problems and complexities in handling the multiple filter belts. One proposed solution to the problem has been utilized in the Synder type filter, wherein one pulling mechanism has been used to pull all of the disposable filter paper belts from the separated shells as required for belt indexing and/or cleaning. However, because of the weight of the sludge-laden belts and frictional forces involved, such a system as a practical matter has been limited to relatively small areas per shell and light dirt loads.

In addition to the above-described frictional forces, there are other problems involved in the handling of multiple rolls of filter belts. Because it is necessary in a multiple shell system for the shells to move vertically during separation for belt indexing (unless expandable or otherwise movable seals are used), the associated supply and discharge rolls for the belts preferably must also move vertically with the shells. This in turn would require elaborate roll-driving systems, such as separate motors, for each pair of supply and discharge rolls, because the vertically changing center-to-center distance between the axes of the rolls does not facilitate driving one level of rolls from an adjacent level. This requirement obviously introduces a substantial cost penalty where multiple shells are utilized.

Accordingly, it is the principal object of the present invention to provide an improved pressure type filter capable of handling high internal hydraulic pressures, and having multiple vertically superimposed shells each of substantially increased area relative to those of the prior art and a filter that can discharge large dirt loads.

SUMMARY OF THE INVENTION

The invention comprises a plurality of vertically superimposed shells, each adjacent pair of which has a horizontal permanent type of filter media belt interposed therebetween. Each belt has an associated supply roll and discharge roll mounted to the opposite ends of the shell immediately beneath it. The lowermost shell is fixed, while each of the remaining shells is vertically movable for separation of the shells to permit indexing and cleaning of the filter belts. All of the rolls are power driven by a friction drive system comprising a single endless loop winch-driven cable which wraps around pulleys associated with each roll. When the filter shells are locked together for filtration, the center-to-center distance of the vertically spaced filter belt rolls is reduced, producing slack in the cable. However, when the shells are separated to permit indexing and cleaning of the belts, the vertical spacing between the shells increases, taking up the slack and allowing the cables to frictionally grip the pulleys to selectively drive them for indexing of the belts. This simple and economical drive system, providing power driven rolls for each filter belt, permits the number of superimposed shells and the filter area per shell to be considerably increased, thereby substantially increasing the filtration capacity of the system. The shell locking system and supporting structure provide the greatly increased strength required to counteract the high hydrostatic forces generated during filtration.

DETAILED DESCRIPTION OF THE INVENTION

Figure 1:
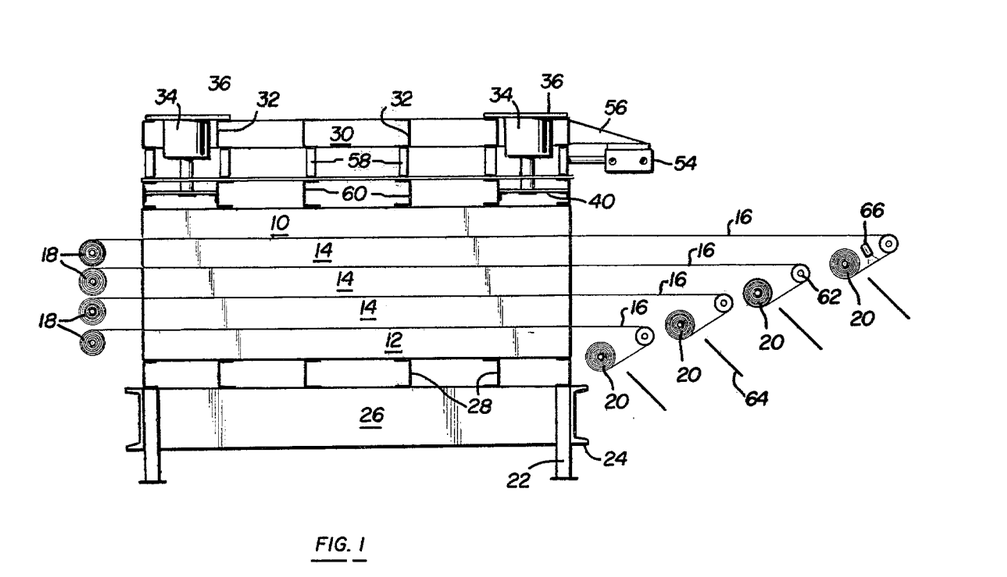
FIG. 1 is a side elevation of the pressure filter system of the present invention.
Figure 2:
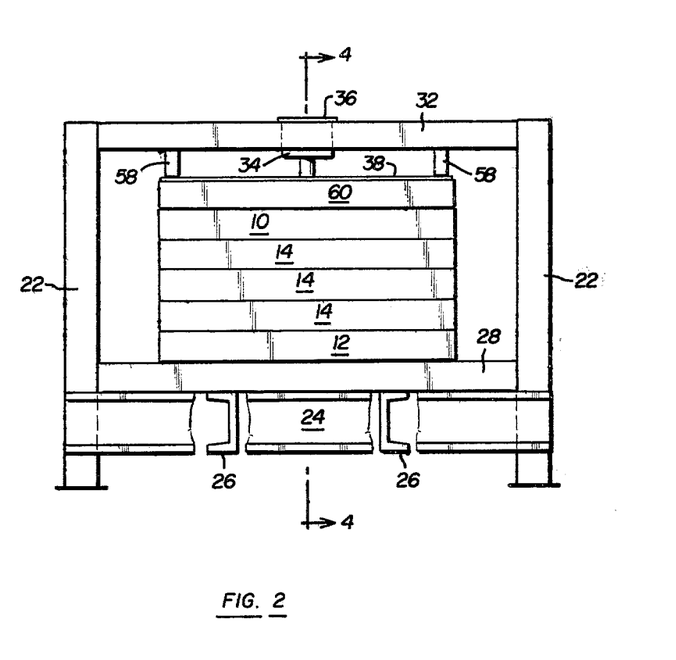
FIG. 2 is an end elevation of the filter of FIG. 1, with the belts and belt rollers omitted for clarity.
Figure 3A:
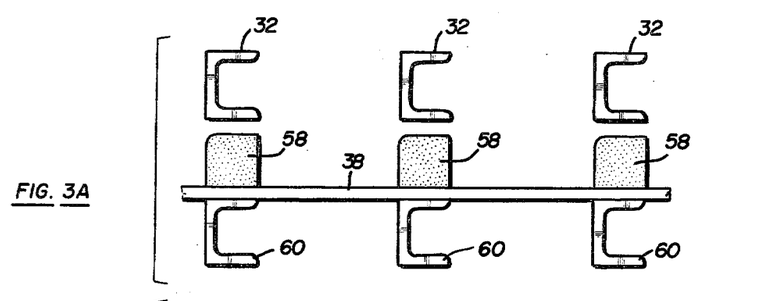
FIGS. 3a through 3e are simplified enlarged views of the shell locking system, showing a sequence of positions.
Figure 3B:
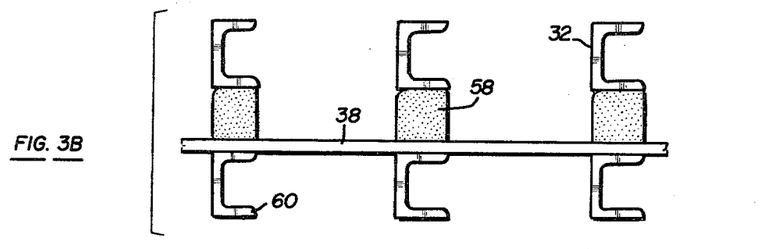
Figure 3C:
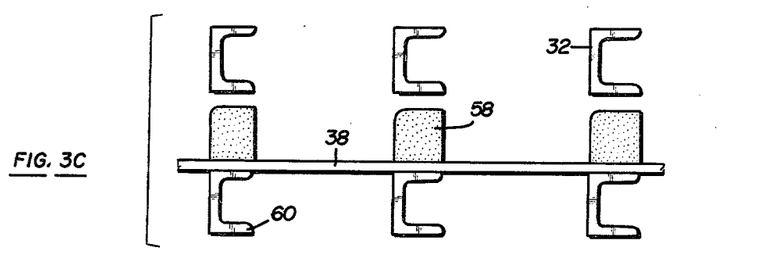
Figure 3D:
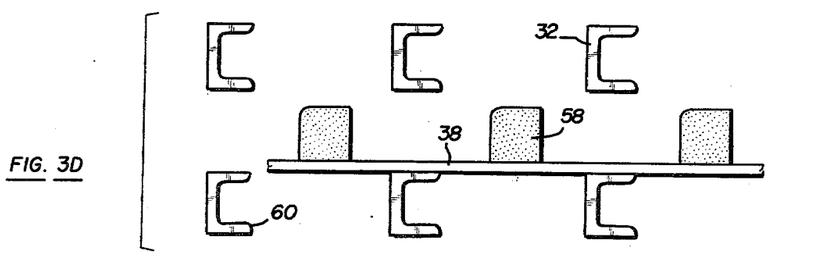
Figure 3E:
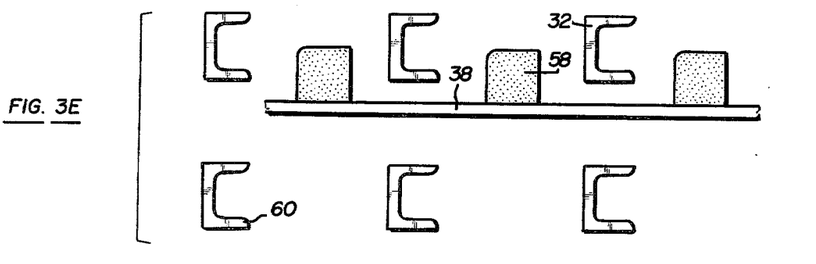

Referring to FIGS. 1 and 2 of the drawings, the pressure filter of the present invention comprises top shell 10, bottom shell 12, and a plurality of intermediate shells 14. Interposed between each pair of adjacent vertically superimposed shells is a filter media belt 16 preferably of the re-usable polymeric fabric monofilament type arranged horizontally between a supply roll 18 and discharge roll 20. Each of these rolls is connected by appropriate brackets (not illustrated) to the edge of the adjacent shell, that is, the shell beneath the associated belt. While three intermediate shells are shown, it is to be understood that any number of intermediate shells may be employed, depending upon the amount of filter area required. Preferably, eight to twelve intermediate shells would be used, because filter area can be easily and economically increased in this manner, no additional strength being necessary because the hydraulic forces generated at each intermediate shell cancel out. By way of example, each filter shell may be six feet wide by twenty feet long.

The filter shells are mounted within and supported by a structural framework comprising four legs 22, a pair of lower primary transverse channels 24 secured to the legs, a pair of lower primary longitudinal channels 26 secured to channels 24 and a plurality of transverse secondary support channels 28 resting upon and secured to longitudinal channels 26. The upper portion of the supporting framework comprises a pair of longitudinal channels 30 secured to legs 22 and a plurality of upper transverse channels 32 secured to channels 30. Further reinforcement to aid in resisting the vertical separating forces during the filtration part of the cycle may be provided by a plurality of vertical tie rods (not illustrated) in the form of heavy square tubing connecting vertically aligned pairs of upper and lower transverse channels 32 and 28. Thus, these vertical structural members are subjected to high tensile forces during filtration.

Bottom shell 12 is rigidly fixed to the supporting framework, while each of the intermediate shells 14 and top shell 10 are vertically movable, to permit shell separation for filter indexing and cleaning, by means of a pair of double acting pneumatic cylinders 34, the upper ends of which are anchored to top plate 36 secured to the tops of transverse channels 32. The lower end of each cylinder rod passes through longitudinally extending slots in a sliding plate 38 and is rigidly secured to plate 40, which in turn is secured to support channels 60. This arrangement enables the plate 38 to slide longitudinally (left and right as viewed in FIG. 1), for a purpose to be described below, while permitting plate 38 to be forced downward or lifted by extension and retraction of the rods of cylinders 34.

Figure 7A:
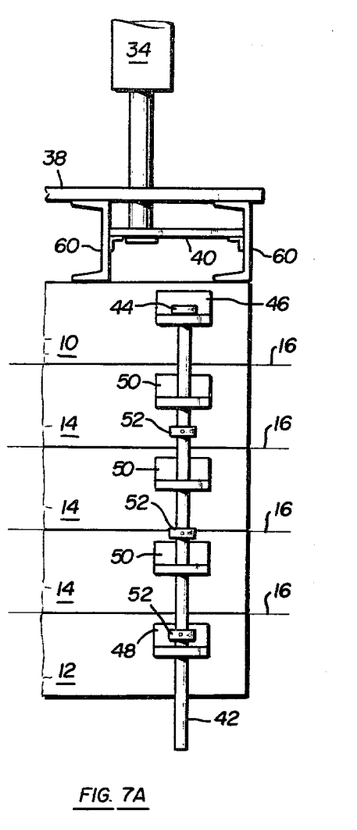
FIGS. 7a and 7b are simplified fragmentary side elevations of a typical corner of the filter shells, showing the filter shell lift and separating mechanism.
Figure 7B:
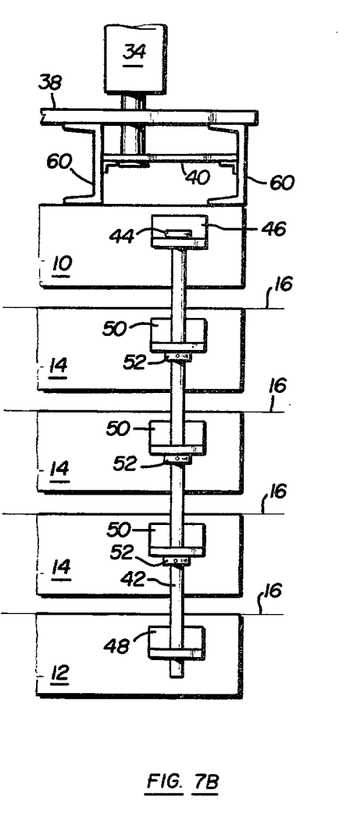
Figure 8:
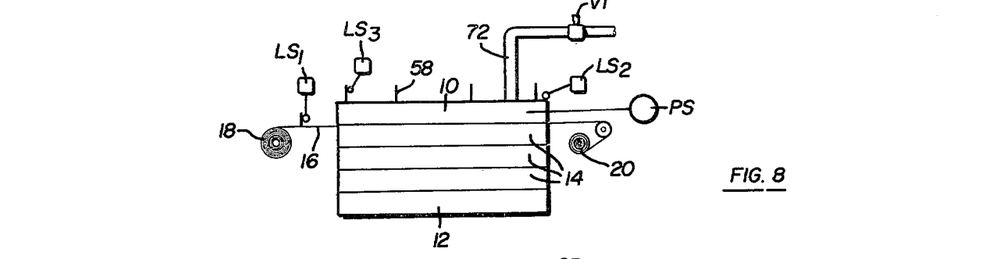
FIG. 8 is a schematic elevation of the filter showing a portion of the control system.

As shown in FIGS. 7A and 7B, filter shells 10 and 14 are selectively raised upon retraction of the rods of cylinders 34 by means of four guide and lift rods 42, one located each of the four corners of the filter apparatus. Each rod has at its upper end a head 44 resting freely on the upper surface of top bracket 46 secured to the side of top shell 10. Rod 42 passes downwardly through a clearance hole provided in top bracket 46 and through clearance holes in bottom bracket 48 and intermediate brackets 50, rigidly secured to the sides of bottom shell 12 and intermediate shells 14, respectively. Lugs 52 are welded at spaced intervals along the length of rods 42 at predetermined locations in order to effect a uniform separation of the shells when the rods are raised as a result of the retraction of cylinders 34 and the raising of plate 40, channels 60 and top shell 10 therewith. Specifically, lugs 52 are located so that when the shells are closed and locked, there is a slight vertical gap between the underside of the uppermost intermediate bracket 50 and the upper face of the associated uppermost lug 52. The corresponding gaps between each succeeding lower lug and the associated intermediate brackets 50 progressively increase.

Therefore, after initial upward movement of lift rods 42, the top lug 52 will engage uppermost intermediate bracket 46, so that continued lifting of rods 42 will carry uppermost intermediate shell 14 upward with the rod. However, because the corresponding gaps are initially greater at each successively lower intermediate shell, each shell will rise a predetermined distance before the next lower shell starts to rise. Such a sequence is necessary so that the desired separation between each pair of shells will be created. For example, if it is contemplated that filter belt indexing and cleaning should occur after build-up of a filter cake approximately one-half inch thick, then the predetermined spacing between the shells upon separation should be about one inch. No lug is provided at the lower end of lift rods 42, beneath bottom bracket 48, because the bottom shell is permanently fixed to the supporting frame. Rods 42 also serve to assure that proper vertical registry and alignment of the shells will be maintained, notwithstanding the periodic vertical separation of the shells for filter indexing and cleaning.

The mechanism for locking the filter shells in their downward position for filtration is shown in FIGS. 1 and 3. A horizontally disposed pneumatic locking cylinder 54 is secured to the upper portion of the filter framework by bracket 56. The rod of cylinder 54 is rigidly connected to sliding plate 38 to cause it to selectively side left and right as viewed in FIG. 1. Spaced along the length of plate 38 are a double row of locking blocks 58, spaced at intervals corresponding to the spacing between upper transverse channels 32. A series of structural supports in the form of transverse channels 60 span and are secured to the top of top shell 10, at the spacing as channels 32. Locking cylinder 54 causes plate 38 and its associated blocks 58 to reciprocate between a locking position shown in FIGS. 1 and 3A through 3C, and a released position as shown in FIGS. 3D and 3E. Appropriate guides on the upper surfaces of channels 60 may be provided to maintain the position of plate 38 in the proper path.

Pneumatic cylinders 34 are double acting, functioning to both lift the shells for belt indexing, as described above, and to force the shells downwardly for locking. In the locking operation, extension of the rods of cylinders 34 acts downwardly on the top shell through channels 60 to overcompress all of seals 78 to provide sufficient vertical clearance for blocks 58 on sliding plate 38 to be freely inserted between channels 60 and channels 32. Such over-compression will last only until filtration begins, whereupon hydraulic pressure within the shells will overcome the pneumatic force of cylinders 34, causing the shells to separate slightly until blocks 58 seat against channels 32, while maintaining sufficient compression of seals 78 to provide the required sealing action.

By way of example, two sixteen inch diameter pneumatic cylinders can produce a total of 40,000 pounds of seal-compressing force at 100 psi pneumatic pressure. Such force would be far exceeded by the upward opposing forces generated when pressurized filtrate is admitted to the shells, and the locking mechanism and supporting structure will thereafter absorb these shell-separating forces.

As best shown in FIG. 1, filter belts 16 pass over and partially around idler rollers 62 before winding up on discharge rolls 20. The turning of belt 16 around idle rollers 62 functions to break loose the sludge from the upper surface of belt 16, allowing it to fall by gravity onto chutes 64. Each belt continues past a blow off header 66 (only one of which is shown), which uses compressed air for further cleaning of the belt. If necessary, a wash with water may also be used, as will be understood by those skilled in the art.

Figure 4:
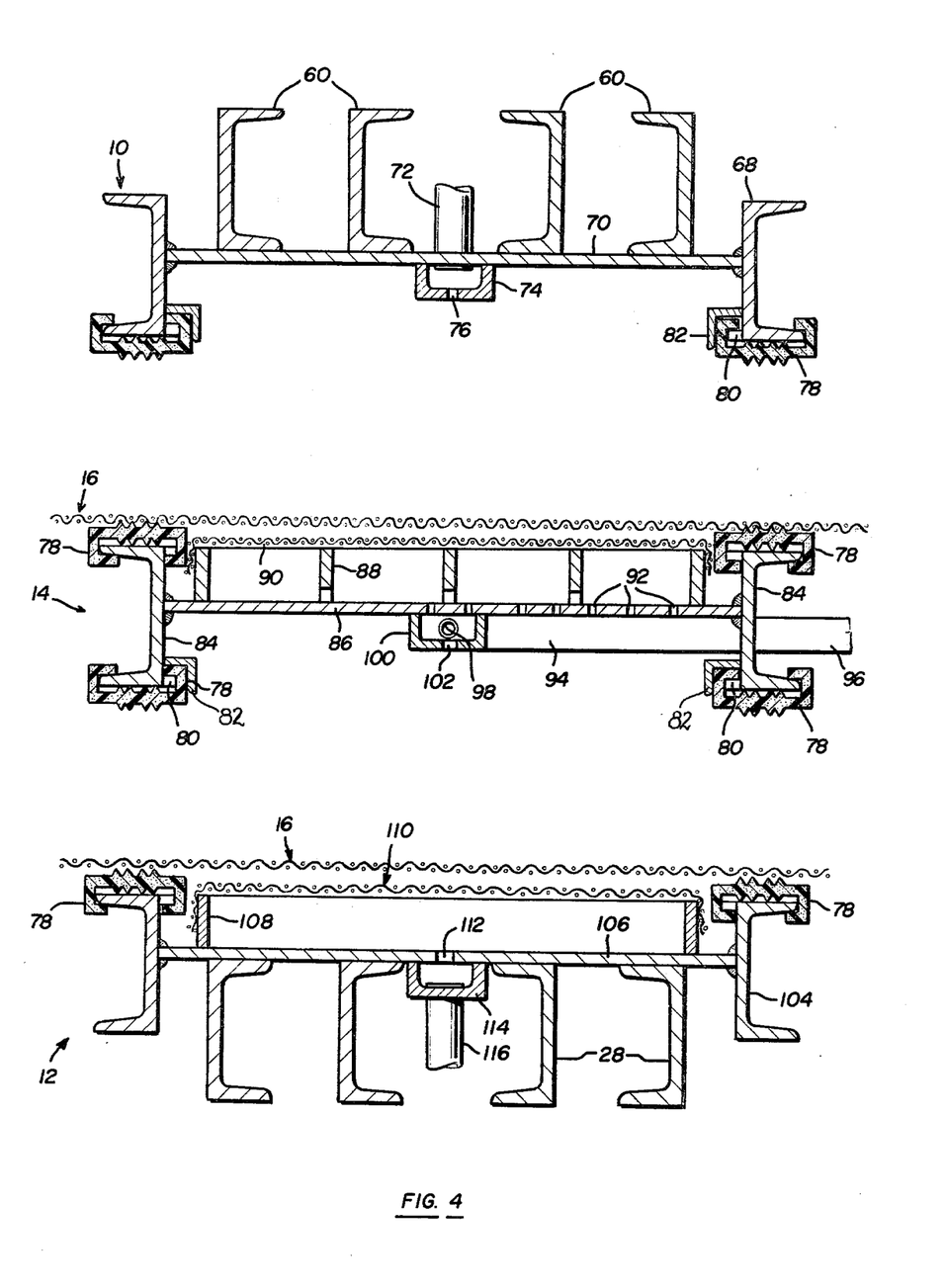
FIG. 4 is a fragmentary exploded cross-sectional view of the top shell, bottom shell and a typical intermediate shell, viewed in the direction of arrows 4—4 of FIG. 2.

The details of construction of the individual shells are best shown in FIG. 4. Open-bottomed top shell 10 comprises four side walls 68 welded to top wall 70, to which are welded the previously described upper supports 60. Contaminated liquid or influent is supplied to top shell 10 by pipe 72 entering through top plate 70, from which the liquid is distributed along the length of a channel 74 provided with spaced outlet holes 76.

In the filtration position of the shells, a seal is established between top shell 10 and the uppermost intermediate shell 14 by means of a full peripheral snap-on compressible gasket 78. Similar gaskets are provided on the mating peripheral edges of all of the shells. A flange 80 is welded onto the side walls of all of the shells, to provide an edge over which the outer edge of gaskets 78 may be snapped. To aid in holding the lower gaskets on each of the respective shells in place there is provided a supplementary retention bracket 82 welded onto the shell side walls.

Each of the intermediate shells comprises side walls 84 and a horizontal barrier plate 86 which subdivides each intermediate shell into upper and lower chambers. A grid 88 is secured to the upper face of plate 86 and, in conjunction with a wire screen 90, supports filter belt 16 across the gap of the open-topped intermediate shells. Wire screen 90 is stretched taut, level with the compressed position of gaskets 78. A portion of barrier plate 86 is provided with drain holes 92 overlying a discharge channel 94 leading to a discharge pipe 96 to carry off the clarified filtrate which has passed from supply pipe 72 and distribution channel 74 of top shell 10 downward through filter belt 16 and the upper chamber of intermediate shell 14.

Each intermediate shell 14 is further provided with a supply pipe 98 connected to main supply pipe 72 and through which contaminated influent enters the lower chamber, from which it is distributed along channel 100 and then downwardly through outlet holes 102 to pass through the next lower filter belt 16 and into the upper chamber of next lower intermediate shell 14 or bottom shell 12, whichever lies beneath the shell 14 in question.

Bottom shell 12 is similarly constructed of side walls 104 and a bottom plate 106 which supports on its upper surface a filter belt-supporting grid 108 and wire screen 110. Plate 106 is provided with a series of drain holes 112 through which clarified filtrate drains into collection channel 114 and discharge pipe 116.

Because all of the shells except bottom shell 12 are vertically movable, the various supply pipes and discharge pipes should be provided with flexible connections to accommodate such vertical displacement, as will be understood by those skilled in the art.

Figure 5:
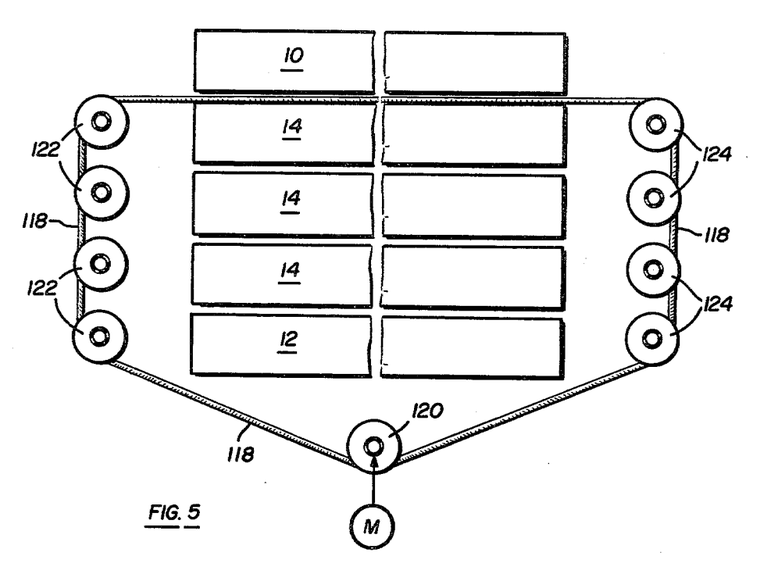
FIG. 5 is a simplified side elevation showing the filter shells in their separated position, along with their associated belt supply and discharge rolls, and showing the drive cable in its taut condition for driving the filter belts.
Figure 6:
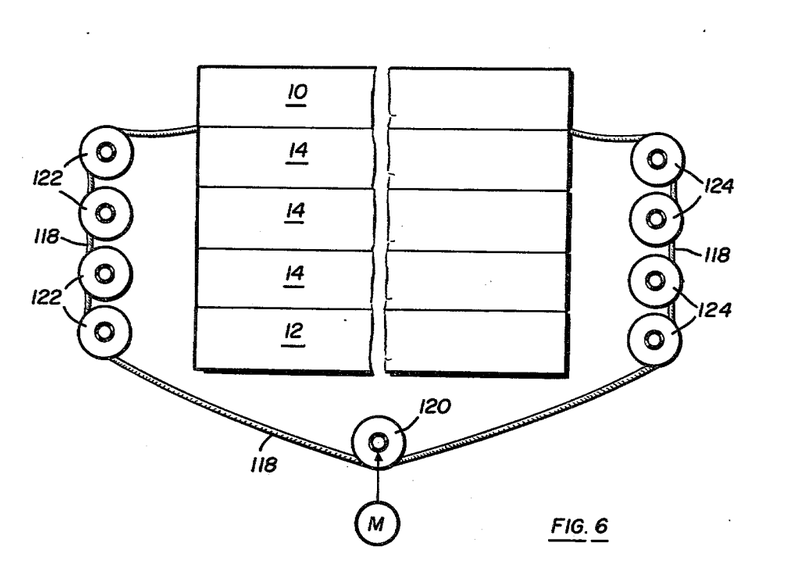
FIG. 6 is a side elevation similar to FIG. 5, but showing the filter shells in their closed position for filtration, with the driving cable accordingly in its slack condition.

The drive system for advancing filter belt 16 is illustrated in FIGS. 5 and 6. An endless flexible aircraft cable 118 is driven by a winch 120 which in turn is powered by an appropriate motor and speed reducer (not illustrated). Cable 118 preferably has several full wraps around winch 120, from which it extends to the lowermost supply pulley 122 fixed to the end of supply roll 18 for rotation therewith. After wrapping once or twice around pulley 122, the cable extends vertically to the next supply pulley, and so forth to each successive supply pulley, wrapping around each. From the uppermost supply pulley it extends across to the top discharge or discharge pulley 124 which rotates with its associated take-up roll 20. Cable 118 similarly wraps around each pulley 124 and returns to winch 120.

Since all of the pulleys are driven at the same speed by cable 118, the diameter of each filter belt roll will determine the linear speed of the belt. Slack inevitably is created by the fact that the supply and discharge rolls for each belt cannot be maintained at equal diameters as the belt winds off one and onto the other. Preferably, the supply rolls are kept larger in diameter than the take-up or discharge rolls at all times, so that such slack will form between the supply rolls and the filter shells during discharge of sludge, and such slack is initially picked up during re-roll of the cleaned belt before the slack initially generated during re-roll on the discharge roll side is taken up to complete the return of the cleaned belt to the supply rolls.

As shown in FIG. 5, cable 118 is of sufficient length to permit the various pulleys to move vertically with their associated shells when the shells are separated for filter indexing and cleaning. Specifically, the length is selected so that the cable will be taut in the fully extended position of the shells, thus tightly frictionally gripping winch 120 and pulleys 122, 124. In that position, rotation of winch 120 will cause all of the supply and discharge rolls to be simultaneously power driven at identical speeds. The drive means is reversible. so that the cleaned filter can be rewound onto the supply rolls to begin the filter cycle again. FIG. 6 shows the slack condition of the cable when the shells are forced downwardly in their locked filtration position against fixed bottom shell 12.

If the belt driving load is too great for one winch and cable system, a dual cable system can be used, with each cable driving alternate pulleys on each side.

Operation

Figure 9:
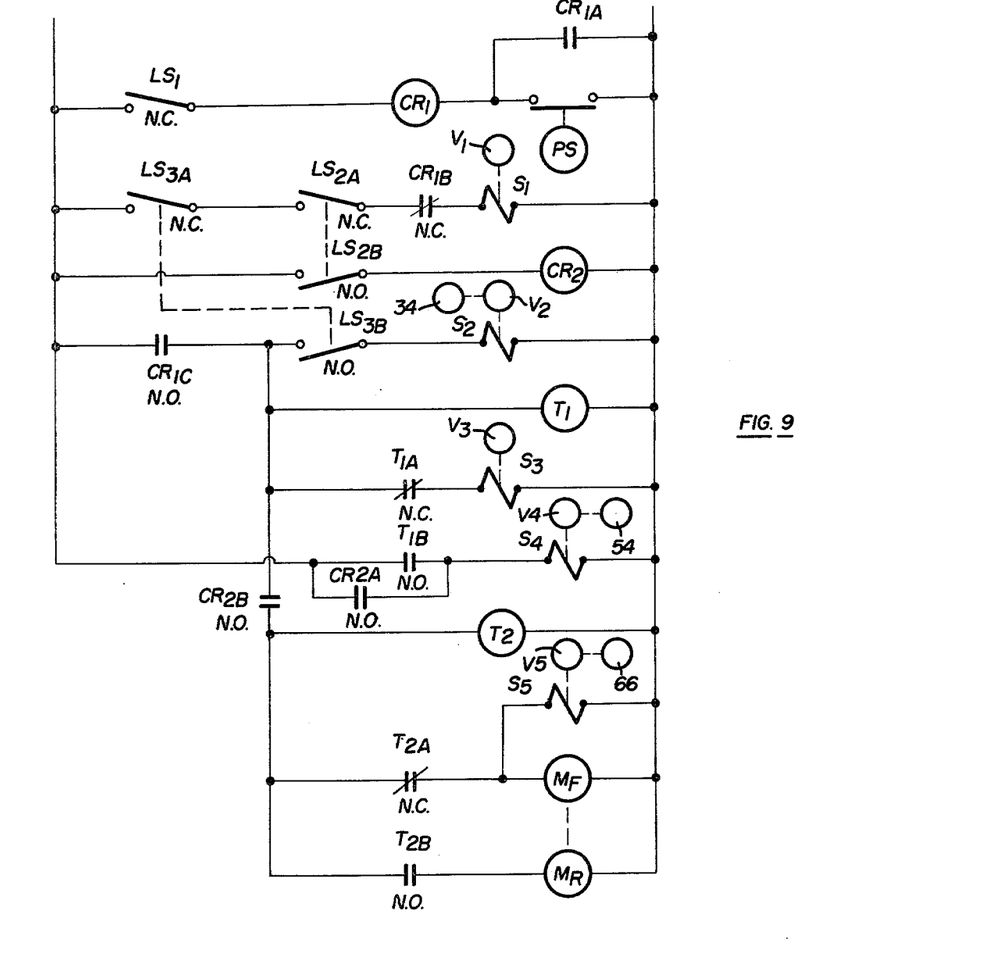
FIG. 9 is a schematic diagram of the electrical control circuit for the filter system.

Referring in particular to FIG. 9, each relay and its associated contacts, as well as each timer and its associated contacts, bear the same subscript numeral. Where more than one set of contacts is controlled by a single relay or timer, a letter subscript is added to the numeral.

The schematic control circuit there illustrated shows the condition of the switches and the relay and timer-controlled contacts in their normal condition during the filtering phase of the cycle, that is, with the shells closed and locked and contaminated liquid under pressure being admitted to all of the shell inlet pipes. Specifically, limit switch $LS_1$ is closed. This switch is always closed except for a momentary opening as the belt completes its re-roll to the position where its traveling portion is fully wound on supply roll 18. Valve $V_1$, controlling the inlet of contaminated liquid to all shells, is held open by solenoid $S_1$ which is energized through normally closed limit switches $LS_{2A}$ and $LS_{3A}$ and the normally closed contacts $CR_{1B}$. The shell position-controlling solenoid $S_2$ is de-energized as a result of open contacts $CR_{1C}$ and normally open switch $LS_{3B}$, causing the four-way valve $V_2$ to be spring-held in a position which causes pneumatic pressure to be applied to the upper chamber of shell-positioning cylinder 34, thereby extending such cylinders and forcing the shells to remain in their closed position. All other electrical components are de-energized. The de-energized position of solenoid $S_3$ places valve $V_3$ in a position to block pressurized air to the shell blowdown system (not illustrated). Solenoid $S_4$ places valve $V_4$ in a position to maintain shell-locking cylinder 54 in its extended shell-locking position, and solenoid $S_5$ places valve $V_5$ in a position to block pressurized air to the belt blow-off header 66.

When the filter cake or sludge accumulation on filter belts 16 has reached a point where the reduction in flow rate therethrough causes a predetermined fluid pressure to be exceeded in top shell 10, pressure switch PS will close, energizing control relay $CR_1$ and closing contacts $CR_{1A}$ and $CR_{1C}$, while opening contacts $CR_{1B}$. The opening of contacts $CR_{1B}$ breaks the circuit to solenoid $S_1$, closing inlet valve $V_1$ and shutting off the supply of contaminated liquid from pipe 72 to all of the shells. Simultaneously, the closing of contacts $CR_{1C}$ energizes solenoid $S_3$ through normally closed contacts $T_{1A}$, thereby causing compressed air to flow through valve $V_3$ to the shell blow-down system, blowing the remaining liquid out of the shells.

Timer $T_1$ is also activated at this moment in the cycle, and after it runs its predetermined time interval, contacts $T_{1A}$ open, terminating the air blow-down in the shells, and contacts $T_{1B}$ close to activate solenoid $S_4$ which causes locking mechanism cylinder 54 to retract from its normal locking position, thereby unlocking the shells.

Retraction of the locking mechanism trips limit switch $LS_3$, opening contacts $LS_{3A}$ (which opening has no effect at this time) and closing contacts $LS_{3B}$. The closing of contacts $LS_{3B}$ activates solenoid $S_2$ to cause fourway valve $V_2$ to supply air pressure to the lower chambers of double acting cylinders to lift the shells to their open position.

The opening of the shells trips $LS_2$, opening contacts $LS_{2A}$ (with no effect) and closing $LS_{2B}$. The closing of the latter switch activates control relay $CR_2$, closing contacts $CR_{2A}$ and $CR_{2B}$. The closing of contacts $CR_{2A}$ assures that solenoid $S_4$ will remain energized, irrespective of subsequent opening of contacts $T_{1B}$, to maintain the locking mechanism in the unlocked position until the shells have once again closed at the completion of the belt indexing and cleaning cycle.

The closing of contacts $CR_{2B}$ starts timer $T_2$, and immediately energizes the belt-driving motor M through normally closed contacts $T_{2A}$. The motor is driven forwardly, to turn winch 120, thus driving cable 118 to advance all of the filter belts 16 from their respective supply rolls 18 to their respective discharge rolls 20. The same circuit energizes solenoid $S_5$ to supply compressed air through valve $V_5$ to blow off header 66 to aid in the cleaning of the belts.

Upon lapse of a preset time on timer $T_2$, contacts $T_{2A}$ open to terminate the forward drive of motor M and to shut off the air to blow off header 66. Simultaneously, contacts $T_{2B}$ close to start motor M turning in the reverse direction, to return the cleaned belt to supply rolls 18.

When a cam on uppermost filter belt 16 momentarily trips limit switch $LS_1$, indicating full return of the cleaned filter belt, the momentary opening of this switch breaks the circuit to $CR_1$, returning $CR_{1A}$ to its normally open position (with no immediate effect), $CR_{1B}$ to its normally closed position (also with no immediate effect) and $CR_{1C}$ to its normally open position. The opening of $CR_{1C}$ cuts off all current to the belt-driving motor M, stopping all of the belts and also resetting timers $T_1$ and $T_2$.

Simultaneously, solenoid $S_2$ is de-energized (though $LS_{3B}$ is still closed), causing the shell-positioning cylinder 34 to lower the shells to their closed position and over-compress seals 78. Closing of the shells returns $LS_{2A}$ to its normally closed position (with no immediate effect) and returns $LS_{2B}$ to its normally open position, de-energizing $CR_2$. This in turn opens $CR_{2A}$, de-energizing $S_4$ and causing locking cylinder 54 to lock the shells in their closed position. Simultaneously contacts $CR_{2B}$ are opened, with no effect because contacts $CR_{1C}$ were previously opened.

The locking of the shells trips limit switch $LS_3$, returning $LS_{3A}$ to its normally closed position and thereby energizing solenoid $S_1$ to open valve $V_1$ and permit pressurized contaminated liquid to once again enter the shells. The re-opening of $LS_{3B}$ which occurs at this time has no effect, because contacts $CR_{1C}$ were already open.

Thus, the above-described cycle is ready to repeat, as soon as the pressure build-up resulting from sludge accumulation again closes pressure switch PS.

While this invention has been described utilizing filter belts which reciprocate, those skilled in the art will recognize that the rolls can simply be removed and exchanged after the cleaned belt has fully traversed from the supply to the take-up rolls. This would necessitate appropriate changes in the controls, but would not depart from the spirit of the present invention.

It is not necessary to continue filtration until the shells fill up with dirt, as is necessary with vertical plate and frame systems to avoid spilling of a wet slurry. Any depth of filter cake or pressure build-up or time lapse can be selected for optimum through-put. Upon opening of the shells, the dry cake stays on the horizontal belts to be transported out of the filter shells during discharge. The complete cycle can be fully automatic, with no manual operation or supervision required.

This invention may be further developed within the scope of the following claims. Accordingly, the above specification is to be interpreted as illustrative of a single operative embodiment of the present invention, rather than in a strictly limited sense.

I now claim:

1. In a liquid filtering apparatus of the pressure type having a plurality of vertically superimposed and vertically separable shells, including a top shell, at least one intermediate shell and a bottom shell; an individual filter media belt horizontally interposed between each adjacent shell pair, said filter media being imperforate to contaminant particles and perforate to liquid; each pair of adjacent shells and its interposed filter media defining one of a plurality of independent and parallel-connected filters; each shell having side walls which are imperforate to liquid; said top shell having a top surface which is imperforate to liquid, an open bottom and an inlet for receiving particle-contaminated pressurized liquid from a source; each of said intermediate shells having a horizontal impervious wall subdividing such shell into an open-topped upper chamber and an open-bottomed lower chamber, each upper chamber having an outlet through which filter liquid which has passed downwardly from the adjacent upper shell through the interposed filter media and the open top may be removed from the apparatus, and each lower chamber having an inlet for receiving particle-contaminated pressurized liquid from said source, which liquid may then flow downwardly through the open bottom and interposed filter media into the open top of the next adjacent lower shell; said bottom shell having an open top, a bottom surface which is impervious to liquid and an outlet through which filtrate liquid which has passed downwardly from the adjacent intermediate shell through the interposed filter media may be removed from the apparatus; each adjacent pair of said shells having opposed aligned peripheral surfaces provided with sealing means to selectively seal the interior of said shells from the exterior when the shells are in adjacent proximity for filtration; the improvement which comprises:

shell positioning means for vertically separating each shell from its adjacent shell to permit each of said filter media belts to be indexed for discharge of sludge outside of said shells, no more than one of said shells remaining fixed during said shell separating step;

each of said filter media belts extending between its own pair of supply and take-up rolls, the supply and take-up rolls for each filter media belt being located at and secured to opposite ends of one of the shell pairs between which each respective filter media belt is interposed, whereby said filter media belt rolls move vertically to the same extent as the shells to which they are secured also move vertically;

and frictional drive means comprising a power-driven endless loop cable which frictionally engages cable-receiving means associated with a plurality of supply-take-up roll pairs for causing the associated filter media belts to index from said supply rolls to said take-up rolls to convey sludge accreted thereon out of said shells for discharge thereof, and thereafter causing a return indexing of said filter media belts along the same paths to their respective starting positions to resume filtration after said shells are brought back together by said shell positioning means.

2. The filter apparatus of claim 1 wherein said shell positioning means lift all of said shells except said bottom shell, which remains fixed, and wherein each supply-take-up roll pair is secured to the lower shell of the shell pair between which the associated filter media belt is interposed.

3. In a liquid filtering apparatus of the pressure type having a plurality of vertically superimposed and vertically separable shells, including a top shell, at least one intermediate shell and a bottom shell; an individual filter media belt horizontally interposed between each adjacent shell pair, said filter media being imperforate to contaminant particles and perforate to liquid; each pair of adjacent shells and its interposed filter media defining one of a plurality of independent and parallel-connected filters; each shell having side walls which are imperforate to liquid; said top shell having a top surface which is imperforate to liquid, an open bottom and an inlet for receiving particle-contaminated pressurized liquid from a source; each of said intermediate shells having a horizontal impervious wall subdividing such shell into an open-topped upper chamber and an open-bottomed lower chamber, each upper chamber having an outlet through which filter liquid which has passed downwardly from the adjacent upper shell through the interposed filter media and the open top may be removed from the apparatus, and each lower chamber having an inlet for receiving particle-contaminated pressurized liquid from said source, which liquid may then flow downwardly through the open bottom and interposed filter media into the open top of the next adjacent lower shell; said bottom shell having an open top, a bottom surface which is impervious to liquid and an outlet through which filtrate liquid which has passed downwardly from the adjacent intermediate shell through the interposed filter media may be removed from the apparatus; each adjacent pair of said shells having opposed aligned peripheral surfaces provided with sealing means to selectively seal the interior of said shells from the exterior when the shells are in adjacent priximity for filtration; the improvement which comprises:

shell positioning means connected to said top and intermediate shells for (1) lifting said top shell and each of said intermediate shells into a filter belt-indexing position wherein a vertical gap is created between said top shell and the uppermost of said intermediate shells, between each adjacent pair of intermediate shells and also between the lowermost intermediate shell and said bottom shell and (2) forcing said shells toward each other into a filtration position wherein said sealing means engage the interposed filter media belt to establish a seal;

each of said filter media belts extending between its own pair of supply and take-up rolls, the supply and take-up rolls for each filter media belt being located at and secured to opposite ends of the shell pairs between which each respective filter media belt is interposed, whereby said filter media belt rolls move vertically to the same extent as the shells to which they are secured also move vertically;

filter media belt indexing means comprising a power-driven endless loop flexible cable wrapping around and extending between pulleys drivingly connected to each of said supply and take-up rolls, said cable means being dimensioned to be slack when said shells are in their filtration position, but having just enough slack to allow said rolls to move vertically apart when their associated shells are separated to their filter media belt-indexing position, in said indexing position all of the slack of said cable being consumed so that said cable is taut and frictionally grips said pulleys to rotate said rolls for indexing said belts when said cable is power-driven.

4. The filter apparatus of claim 3 wherein said shell positioning means are rigidly connected to said top shell, and wherein said apparatus further comprises lost motion linkage means interconnecting all of said shells except said bottom shell, upward movement of said top shell from its locked filtration position lifting the next lower intermediate shell through said lost motion linkage means only after predetermined lost motion has occurred therebetween, with each next succeeding intermediate shell beneath said top shell rising only after the lost motion between it and the shell immediately above it has been consumed, thereby to establish a gap between each shell pair sufficient to permit said filter media belts to traverse horizontally for discharge of accreted sludge.

5. The filter apparatus of claim 3 wherein said filter media belts are of the permanent type, filter media belt cleaning means positioned adjacent each permanent filter media belt for removing sludge from said permanent filter media belts, and reversing means associated with said power drive for said flexible cable to permit said cable and said permanent filter media belts to be driven in either direction so that said permanent filter media belts can be rewound along the same path from said discharge rolls onto said supply rolls after cleaning.

* * * * *